Feb. 19, 1924.
W. J. SPIRO
LIGHT CONTROL SWITCH
Filed April 7, 1920   2 Sheets-Sheet 2
1,484,239
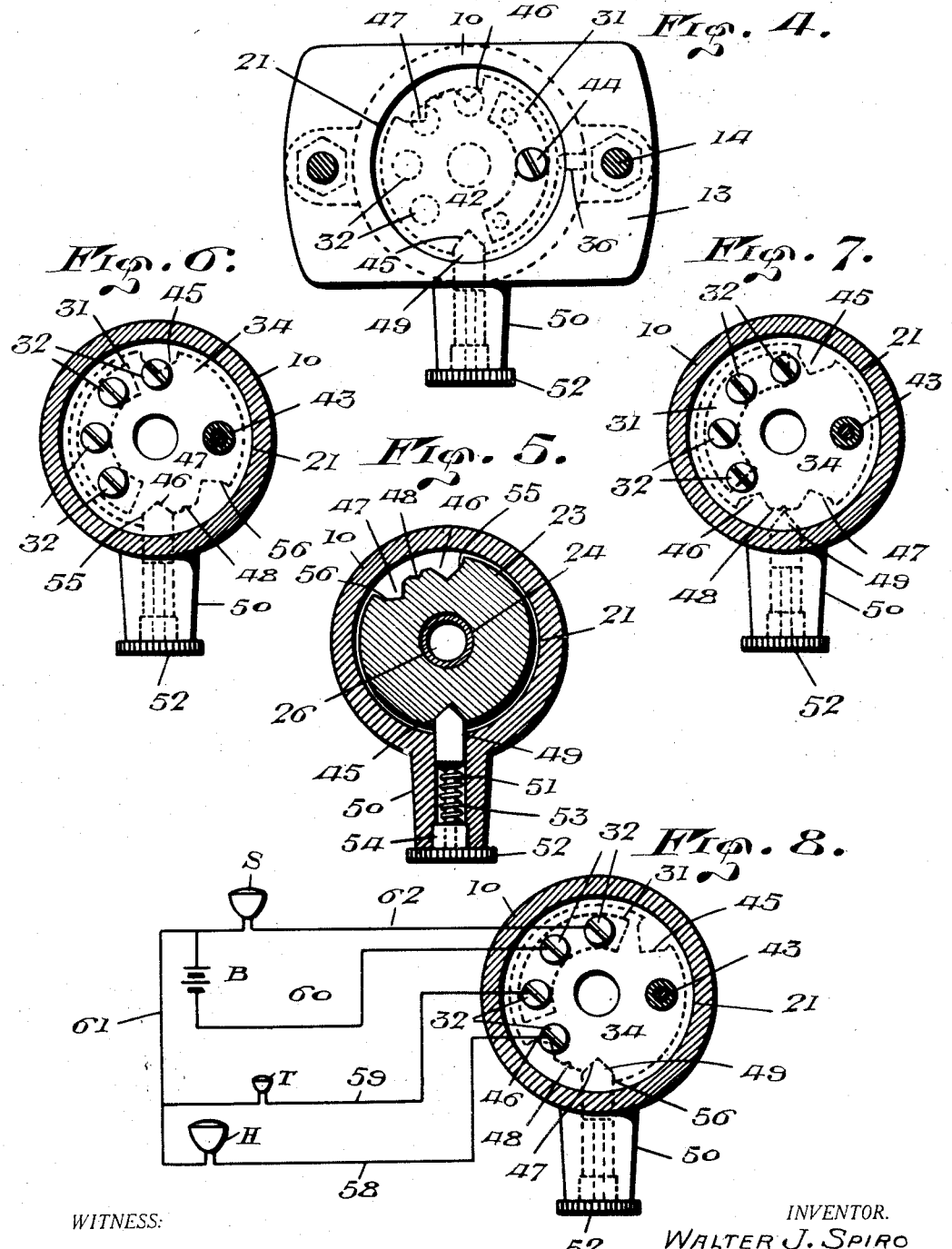
WITNESS:
Thos W Rey
INVENTOR.
WALTER J. SPIRO
BY Alfred T. Gage
ATTORNEY.

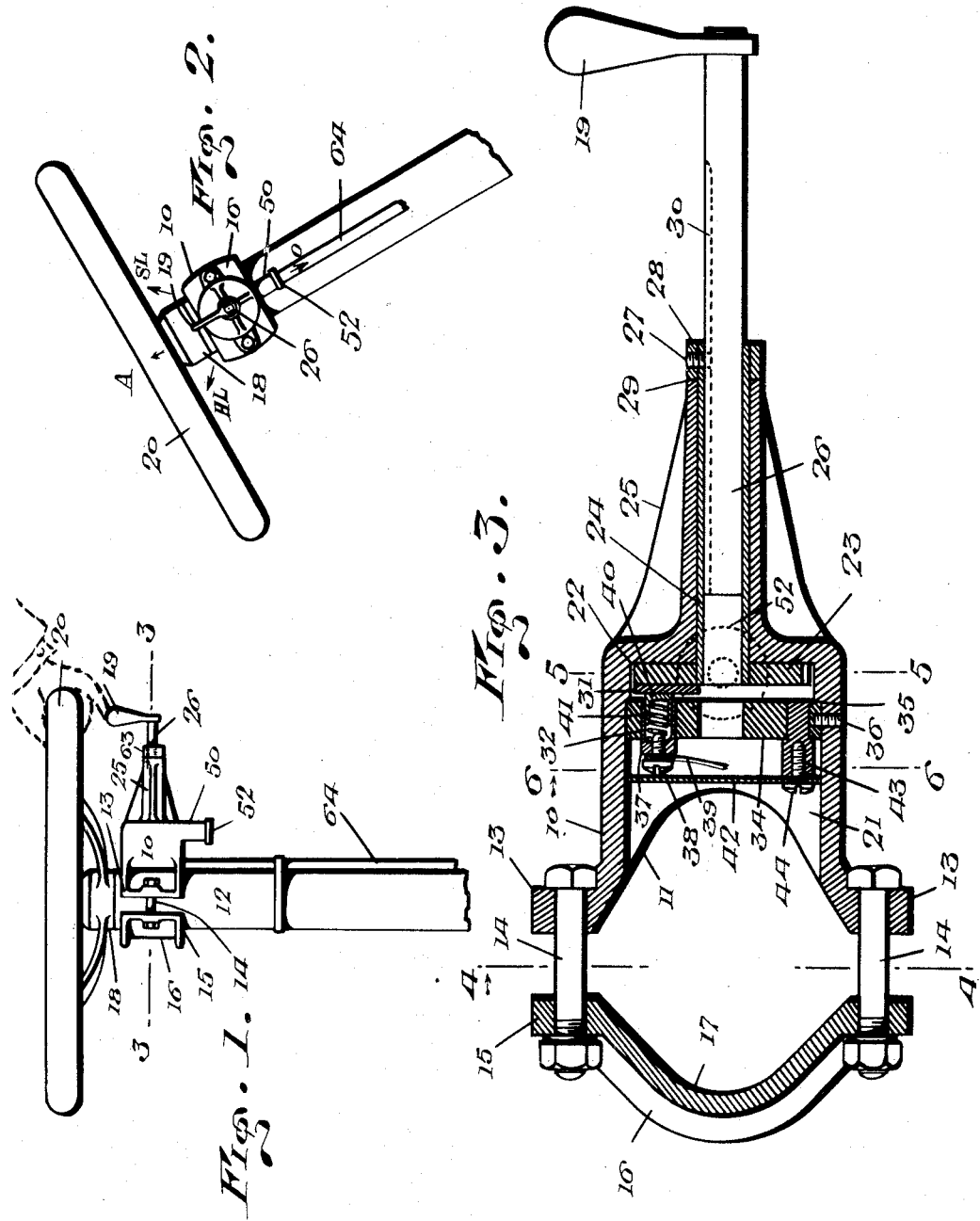

Patented Feb. 19, 1924.

1,484,239

UNITED STATES PATENT OFFICE.

WALTER J. SPIRO, OF WHITE PLAINS, NEW YORK.

LIGHT-CONTROL SWITCH.

Application filed April 7, 1920. Serial No. 372,069.

*To all whom it may concern:*

Be it known that I, WALTER J. SPIRO, citizen of the United States, residing at White Plains, in the county of Westchester and State of New York, have invented certain new and useful Improvements in Light-Control Switches, of which the following is a specification.

This invention relates to a light control switch and to a construction thereof particularly adapted for application to the lighting system of an automobile or other vehicle.

The invention has for an object to provide a novel and improved construction of switch arranged to be mounted upon the steering post of an automobile and having its operating member disposed adjacent the hand hold of the steering wheel in position for actuation by the fingers of the operator's hand when grasping the wheel.

A further object of the invention is to present an improved construction of switch by which circuits to the head and side lights may be conveniently controlled and the switch locked when all lights are out of circuit and yieldingly held in position for control of said head and side lights.

Another object of the invention is to provide a novel construction of switch comprising a casing supporting within a chamber fixed circuit contacts and a cooperating rotary contact disk operable by a handle extended therefrom, said handle being longitudinally adjustable relative to the part upon which the switch is mounted for operation.

Other and further objects and advantages of the invention will be hereinafter set forth and the novel features thereof defined by the appended claims.

In the drawings:—

Figure 1 is a front elevation of the invention applied to a steering post;

Figure 2 is a side elevation thereof;

Figure 3 is an enlarged section on line 3—3 of Figure 1;

Figure 4 is a section on line 4—4 of Figure 3;

Figure 5 is a similar view on line 5—5 of Figure 3;

Figure 6 is a section on line 6—6 of Figure 3;

Figure 7 is a similar view with parts in shifted position;

Figure 8 is a like view showing a further shifted position and the lighting circuits controlled thereby.

Like numerals refer to like parts in the several figures of the drawings.

The numeral 10 designates a switch casing which may be of any desired material or configuration, but preferably formed with a seat 11 at its inner end to fit the steering post 12 of an automobile. This seat is provided at opposite sides with securing flanges 13 adapted to receive holding bolts 14 which also pass through lugs 15 on a clamping plate 16 having a seat 17 to fit the steering post. The switch is thus mounted upon the post adjacent the steering wheel 18 thereon so that the finger piece 19 of the switch lies beneath and adjacent the rim or periphery 20 of the wheel in position to be operated by the fingers of the hand of the operator grasping the wheel, as shown in Figures 1 and 2. The switch casing may however be mounted in any desired manner to accomplish this purpose.

The chamber 21 within the casing 10 is formed with an end wall 22 in contact with which a disk 23 is disposed and from this disk a sleeve 24 extends outward through a tubular extension 25 from the casing. Within this sleeve an operating rod 26 is adjustably mounted in any desired manner, for instance by means of a set screw 27 passing through a collar 28 upon the portion of the sleeve projection beyond the end 29 of the extension 25 and bearing thereon. This screw 27 enters a longitudinal groove or channel 30 in the rod which has the finger piece 19 secured at its outer end. The finger piece may be thus adjusted relative to the rim of the steering wheel in position to be conveniently operated by the fingers of the operator's hand.

The contact disk 23 carries upon its inner face a conducting strip or sector 31 sufficient in area to establish circuit between all of the circuit contacts 32 mounted upon the block 34 which rests in contact with a seat 35 in the chamber 21 and is held in position by a set screw 36 passing through the casing as shown in Figure 3.

These circuit contacts may be of any desired character, for instance, comprising a shell 37 carrying a binding screw 38 for the circuit wiring 39 and provided with a cap 40 which is forced toward the sector 31 by an interposed spring 41. In the illustration of the invention shown four of these contacts are used and each are of similar character, but the number thereof may be varied at will. For protecting the contacts 32 and their wiring against moisture or injury an insulating plate 42 is disposed within the chamber 21 and supported in any preferred manner, such as a stud 43 mounted on the block 34 and receiving a holding screw 44 extending through the plate 42.

For the purpose of locking the disk 23 when all lights are out of circuit and yieldingly retaining it in certain intermediate positions, the periphery of the disk is provided with a locking seat 45 and retaining seats 46 and 47 connected by a reduced portion 48 of the disk. Cooperating with these seats is a yielding detent 49 of any desired type, for instance, slidingly mounted in the extension 50 from the casing 10 and having a stem 51 provided with an operating head 52 for its withdrawal. The detent is held in contact with the disk by means of a spring 53 interposed between the detent and a collar 54 mounted in the extension 50, as shown in Figure 5. The end walls 55 and 56 of the retaining seats 46 and 47 respectively contact with this detent and lock the disk against movement in either direction beyond the two positions controlling the head and side lights so that the lights cannot be accidentally thrown off by the fingers.

The circuit control for which this invention is particularly adapted is shown in Figure 8 wherein a line 58 extends from one contact 32 to the head lights indicated by H, and a line 59 from the next contact to the tail light T, while the third contact has a line 60 to a battery B and connected by a line 61 with the lines 59 and 60. A line 62 extends from the fourth contact to the side or dimmer lights S and is connected with the battery. The reference herein to head and side lights does not necessarily refer to separate fixtures but includes any arrangement of head or bright lights with side or dim lights.

In the operation of the invention when all lights are out of circuit the parts are in the position shown in Figure 4 with the sector out of circuit with the contacts and the disk locked by the detent. When in this position the finger piece is depressed into line with arrow O Figure 2 and it is necessary to withdraw the detent in order to operate the switch. As the disk is rotated to bring the sector into circuit with the first three contacts, see Figure 6, the head and tail lights are brought into circuit with the battery and the detent enters the retaining seat 46. The end wall 55 thereof prevents accidental returning movement of the disk without withdrawal of the detent, while the reduced portion 48 permits the yielding travel of the disk to the next position. With the contacts as shown in Figure 6 the finger piece lies in alignment with the arrow H L Figure 2 in position to be conveniently shifted by the operator's fingers into its next location indicated by arrow A, Figure 2 where all lights are in circuit as shown by Figure 7. At this time the detent rides upon the reduced portion 48 of the disk and the parts may be easily shifted to either the former, or the next position which cuts the head lights out of circuit and throws in the side lights, as shown in Figure 8. The detent then enters the retaining seat 47 and its end wall 56 prevents further movement in that direction, while the finger piece lies in alignment with the arrow S L, Figure 2. The positions of this piece for the different circuits may be indicated upon relatively fixed and movable parts in any preferred manner, such as indications upon the switch casing and collar, as shown at 63 in Figure 1. The wiring from the several contacts may be conducted to the lights and battery in any ordinary manner, such as the tubing 64 extending along the steering post.

From the foregoing description it will be seen that the lights may be locked out of circuit and readily shifted by the hand upon the steering wheel from head or full light position to side or dim light position and temporarily retained with all lights in circuit whenever desired. This permits the operator to quickly and readily shift from head to side lights or vice versa while further finger shifting, except between these positions, is prevented as the manual withdrawal of the detent is required for that purpose. The mounting for the operating rod and finger piece are such that the latter may be adjusted into convenient position beneath the rim or grip of the steering wheel from which the operator is not required to remove his hand in shifting from full to dim lights as occasions on the road may require. This invention therefore provides for the most convenient and quick shifting of the lights which is very important in night driving and renders difficult the unintentional or unauthorized operation of the light switch when out of circuit, or to throw all lights out of circuit. The construction also prevents accidental disarrangement of the parts or short circuiting as they are enclosed and protected within the chamber of the switch casing.

The invention presents a simple, efficient and economically manufactured construction, and while the specific details thereof have been shown and described the invention is not confined thereto as changes and alterations may be made within the scope of the following claims.

What I claim is—

1. In a control switch, the combination with a steering post and wheel, of a stationary switch casing mounted upon the post and provided with a lever having a plurality of operating positions and disposed to travel in substantially the circumferential path of the hand hold of the wheel and spaced therefrom for actuation in all positions by a depending finger of an operator's hand resting in normal position upon said hand hold.

2. In a control switch, the combination with a steering post and wheel, of a stationary switch casing mounted upon the post and provided with a lever having a plurality of operating positions and disposed to swing in a vertical plane above its axis and in substantially the circumferential path of the hand hold of the wheel and spaced beneath the same for actuation in all positions by a depending finger of an operator's hand resting in normal position upon said hand hold.

3. In a control switch, the combination with a steering post and wheel, of a casing provided with a chamber, circuit contact members disposed therein, an extension from said casing, an operating rod slidably mounted therein and carrying at its inner end an oscillating contact plate, and means for adjusting said rod longitudinally upon said extension relative to the hand hold of said wheel.

4. In a light control switch, a casing provided with a chamber, a circuit contact means disposed therein, a sleeve mounted in the casing and secured to said means, an operating rod provided with a finger piece and disposed within said sleeve, and means for longitudinally adjusting said rod within said sleeve.

5. In a light control switch, a casing provided with a chamber, a circuit contact disposed therein, a rotatable disk carrying a conducting strip cooperating with said contact, a sleeve mounted in the casing and secured to said disk, an operating rod provided with a finger piece and disposed within said sleeve, a collar mounted upon said sleeve and bearing against an end of the casing, and a set screw extending through said collar into a longitudinal groove in said rod.

6. In a light control switch, a casing provided with a chamber and a tubular extension therefrom, a rotatable disk provided with a conducting strip and disposed in contact with an end wall of said chamber, means disposed in said extension for rotating said disk, a circuit contact block within said chamber, means carried by the casing for retaining said block in fixed position, and a plate disposed within said chamber for enclosing the contacts of said block.

7. In a light control switch, a casing provided with a chamber, a tubular extension from the opposite end of said chamber, a rotatable conducting disk disposed in contact with the end wall of said chamber, operating means within said extension and secured to said disk, a collar on said means engaging the outer end of said extension, a circuit contact block secured within said chamber to cooperate with said disk, an extension from the chamber at the periphery of the disk, and a resilient detent therein to engage said disk.

In testimony whereof I affix my signature.

WALTER J. SPIRO.